Aug. 28, 1956     R. BOTOLFSEN     2,760,746
PORTABLE SUPPORT FOR SADDLES
Filed Feb. 2, 1953
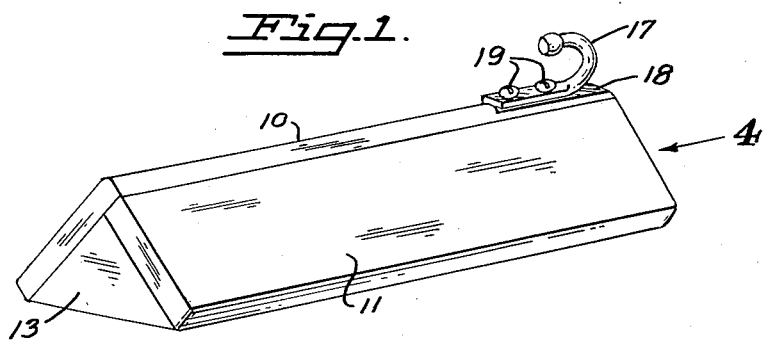
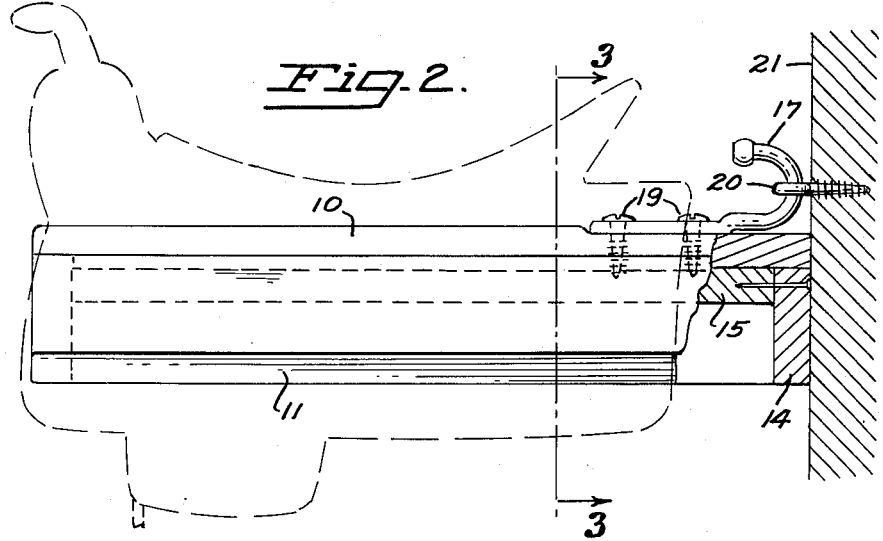
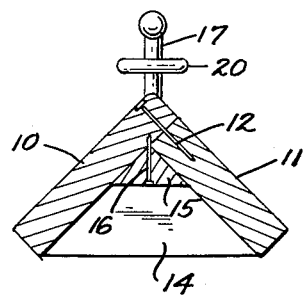
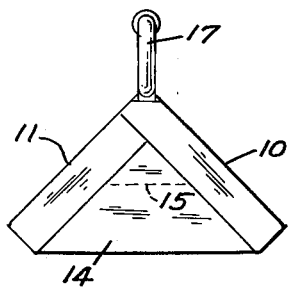
INVENTOR.
ROY BOTOLFSEN
BY
ATTORNEY United States Patent Office 2,760,746
Patented Aug. 28, 1956

2,760,746

PORTABLE SUPPORT FOR SADDLES

Roy Botolfsen, San Anselmo, Calif.

Application February 2, 1953, Serial No. 334,576

1 Claim. (Cl. 248—224)

This invention relates to a portable support for saddles, and more particularly to a saddle support that may be easily and quickly attached or detached from a connecting member secured to a base or wall.

It is common practice for horsemen and stable owners to build supports for storing saddles. This practice is advisable in order to protect the saddles, which are often expensive and adorned with silver ornamentation. Many stable owners build strong, permanently attached supports that protrude from the walls of the stables. Others use semi-portable saddle holders in the form of stands that are placed upon the ground and which have sturdy legs to support the saddle holding member. Although both the fixed bracket and the stand types of supports may be used to store saddles, they take up much needed space in small or crowded stables and such saddle supports cannot be conveniently moved out of the way when not in use.

Furthermore, the foregoing types of saddle supports are not portable, and cannot conveniently be taken on trail rides or along with a horse trailer. When a rider stops for the night on a trail ride, he may have to place the saddle on the ground since he has no saddle support along on the ride. Also, on parades in which the horse is brought to the starting point in a horse trailer, the horseman does not have a support to hold the saddle in a convenient place while he is saddling the horse. Spirited horses generally will not stay still while unattended. Consequently, one person cannot take the horse out of the trailer and then go back for the saddle. Instead the rider must first take out the expensive saddle, throw it on the ground, lead out the horse, and then try to hold the horse while picking up the saddle from the ground. Also, when unsaddling the horse at the end of the parade, the same problem arises, and the horseman has to throw the expensive saddle on the ground before leading the horse into the trailer. As a result, it is a very common occurrence for expensive saddles to become damaged while saddling or unsaddling the mounts on trail rides or parades.

Summarizing this invention, it has as its objects, among others, the provision of a portable, sturdy support for saddles or the like, which support may be easily and quickly attached or detached from an upright base. This is accomplished by providing an elongated saddle supporting member with an attached hook-like anchor member adapted to engage a connecting member secured to an upright base. One end of the elongated saddle supporting member is adapted for abutment with said upright base, and the hook-like anchor member is attached to said saddle supporting member near such abutment end, but spaced therefrom for detachable engagement with the connecting member which is secured to the upright base.

From the preceding it can be seen that another object of this invention is the provision of a support for saddles or the like which may be easily removed when the support is not in use in order to provide more room in crowded stables.

It is a further object of this invention to provide a portable support for saddles or the like which may quickly be set up on trail ride stops, or on the outside of horse trailers.

Another object of this invention is to provide a sturdy, portable support for saddles or the like that is simple and inexpensive to make.

Other and further objects of this invention will become apparent from a reading of the following specification.

Referring to the drawings:

Fig. 1 is an isometric view of the saddle support of this invention.

Fig. 2 is a side elevation of the saddle support detachably secured to an upright base, with a portion of the support broken away to illustrate bracing members on the saddle support; a supported saddle being illustrated in phantom lines.

Fig. 3 is a vertical sectional view taken in a plane indicated by line 3—3 in Fig. 2.

Fig. 4 is an elevation of the abutment end of the saddle support looking in the direction of arrow 4 in Fig. 1.

The portable support illustrated in the drawings, comprises an elongated saddle supporting member composed of a rectangular board 10 to which is attached in corner butt relationship along its entire length another rectangular board 11. Board 11 is of slightly less width than board 10 so that the two boards form a V shaped saddle supporting member adapted to be used with the point of the V facing upward. This shape is particularly advantageous for use in support of a saddle. The boards 10 and 11 may be attached to each other by means of nails 12 as illustrated in Fig. 3. However, any well known means of fastening may be employed, and the use of screws produces a stronger support. One end of the elongated saddle supporting member formed by boards 10 and 11 is made to form a planar surface substantially perpendicular to the axis of the such supporting member in order to be adapted for abutment against an upright base, as is best shown in Fig. 2.

Although use of the boards 10 and 11 alone provides a suitable elongated saddle supporting member, a stronger support may be provided by the inclusion of bracing members. For this purpose, triangular end forming braces 13 and 14 are secured to the boards 10 and 11 in any suitable manner such as by nails (not shown) to strengthen the supporting member and to improve its appearance. Also, as shown in Fig. 2 and Fig. 4, end forming brace 14 serves as an additional part together with ends of boards 10 and 11 to form a planar end surface suitable for abutment with an upright base surface. However, as previously mentioned, the surface formed by the ends of boards 10 and 11 is sufficient.

A triangular shaped molding 15 disposed within the inner space between the boards 10 and 11, and bounded by the end forming braces 13 and 14 provides an additional brace to enable the saddle support to withstand abuse and the weight of heavy saddles. This triangular shaped molding 15 is attached to the elongated saddle supporting member by nails 16 or by any other suitable fastening means.

The foregoing embodiment of the elongated saddle supporting member of the portable saddle support hereof is illustrated as being composed of a plurality of wooden parts. This type of construction with wooden parts is much to be preferred for its simplicity, inexpensiveness, and ease of construction. However, for purposes of providing the saddle support of this invention, the elongated saddle supporting member may be made of a single piece of wood or it may be made out of metal or plastic. Also, any elongated shape suitable for supporting a saddle may be employed, provided that one end is suitable for abutment with an upright base.

The elongated saddle supporting member has an anchor member shown as J-bolt or hook 17 attached adjacent the abutment end and at the top of said supporting member. The J-bolt 17 is positioned on a small leveled recess 18 in the angular top of the saddle supporting member and is attached to such supporting member by means of screws 19. Alternatively a stronger connection may be made by employing bolts instead of screws. The open portion of J-bolt 17 faces along the length of the saddle supporting member and away from the adjacent abutment end of such member. As a result of this positioning J-bolt 17 forms the anchor means for detachable engagement of the saddle support hereof with a connecting member shown as eye screw 20 which is attached to and protruding from upright base 21, which may be a barn wall, fence post or tree.

Also, as shown in Fig. 2, J-bolt 17 is spaced a short distance from the abutment end of the elongated saddle supporting member. This spacing is important in order to provide that the major part of the planar surface of the saddle support abutment end will engage the upright base 21. It is apparent from Fig. 2 that eye-screw 20 will protrude from the surface of the upright base 21. Consequently, if J-bolt 17 is placed at the extreme end of the elongated saddle supporting member rather than spaced inwardly from such end, only the bottom part of the abutment end of such elongated supporting member would engage the surface of the upright base 21. This would result in tilting of the axis of the saddle support, and a wobbly support with undesirable stresses imposed upon the support. With proper spacing of the J-bolt 17, substantially the entire abutment end of the elongated saddle supporting member engages the surface of upright base 21. As a result, a firm, level support is provided for a saddle, as shown in phantom lines in Fig. 2. Although the necessity of such spacing of the J-bolt 17 may be avoided by placing the eye screw 20 in a recess formed in upright base 21, it is usually not desirable or convenient to cut recesses for this purpose.

The exact distance of the spacing of J-bolt 17 from the abutment end of the saddle support is not critical. This distance depends upon the size of eye screw 20 and the distance that the eye screw is screwed into upright base 21. For most eye screws a distance of around a half inch spacing between the closed end of J-bolt 17 and the abutment end of the saddle support is suitable. However, greater spacing of the J-bolt 17 from said abutment end is required for longer or larger eye-bolts.

As an alternative to placement of the J-bolt 17 on the elongated saddle support and the eye screw 20 on the upright support, the position of these engaging members may be interchanged. Also, a J-bolt or J-screw may be placed on the upright base to serve as a connecting member, and an eye screw anchor member may be placed protruding upwardly near the abutment end of the saddle support. Furthermore, it is apparent that several types of hook-like members may be used for detachable engagement in place of the J-bolt 17 and eye-screw 20 shown in the drawings. For example both hook-like engaging members may be of a J or hook shape, the eye-screw may be replaced by a large metallic staple, or a staple of the type that is secured to a metal plate adapted to be screwed onto the upright base 21 may be used. This latter type of staple is commonly employed together with hasps and padlocks and is readily available. When such staple is bent upwardly at a 45 degree angle from the horizontal, it forms a particularly excellent connecting member on the upright base. However, the arrangement shown in the drawings is preferred because it is strong, easy to manufacture, and simple for the user to set up.

It can be seen that the portable saddle support of the invention can be easily attached or detached and stored away when not in use, thereby providing additional room in crowded stables. Also, the support and an eye-screw may easily be taken along in the chuck wagon on trail rides, and on stopovers on such rides the saddle support may be fastened to any suitable upright base such as a tree. Similarly, connecting members that take little space such as eye-screws or staples, may be permanently placed in several suitable locations on the outside or inside of horse trailers, thereby permitting the saddle support to be attached to a convenient eye-screw whenever desirable.

I claim:

A portable saddle support adapted for detachable connection to an upright member consisting of an elongated supporting body having a relatively narrow top edge, a relatively wide bottom, and opposite sides diverging downwardly generally from said top edge to said bottom, the lengthwise dimension of said body between opposite ends thereof being several times greater than the width of said bottom, one of said ends of said body providing a flat abutment surface perpendicular to the lengthwise dimension and of substantially the same shape and area as the cross sectional shape and area through said diverging sides of said supporting body; and a J-bolt comprising leg and hook portions having its leg attached to the relatively narrow top edge of said supporting body adjacent said abutment surface and its hook projecting upwardly from said relatively narrow top edge, the open portion of the hook facing away from said abutment surface to provide an anchor for attachment to a protruding connecting element secured to the upright member, all portions of said J-bolt being spaced inwardly from said abutment surface to provide for flush abutment of said surface against said upright member.

References Cited in the file of this patent

UNITED STATES PATENTS

| 741,922 | Muldoon | Oct. 20, 1903 |
| 761,156 | Fegert | May 31, 1904 |
| 873,129 | Humphries | Dec. 10, 1907 |
| 1,569,278 | Hickman | Jan. 12, 1926 |

FOREIGN PATENTS

| 837,459 | Germany | Apr. 28, 1952 |

OTHER REFERENCES

Jackson's 1871 Catalogue on Stable Fixtures, Plate XXXV, Fig. 195. (Copy in Pat. Off. Scientific Library, NA 8345 J2.)